May 12, 1942.  G. MIETHER  2,283,082
PIPE SLIP
Filed Feb. 19, 1941  2 Sheets-Sheet 1

Inventor
George Miether
By J. Preston Swecker
his Attorney

May 12, 1942.   G. MIETHER   2,283,082
PIPE SLIP
Filed Feb. 19, 1941   2 Sheets-Sheet 2
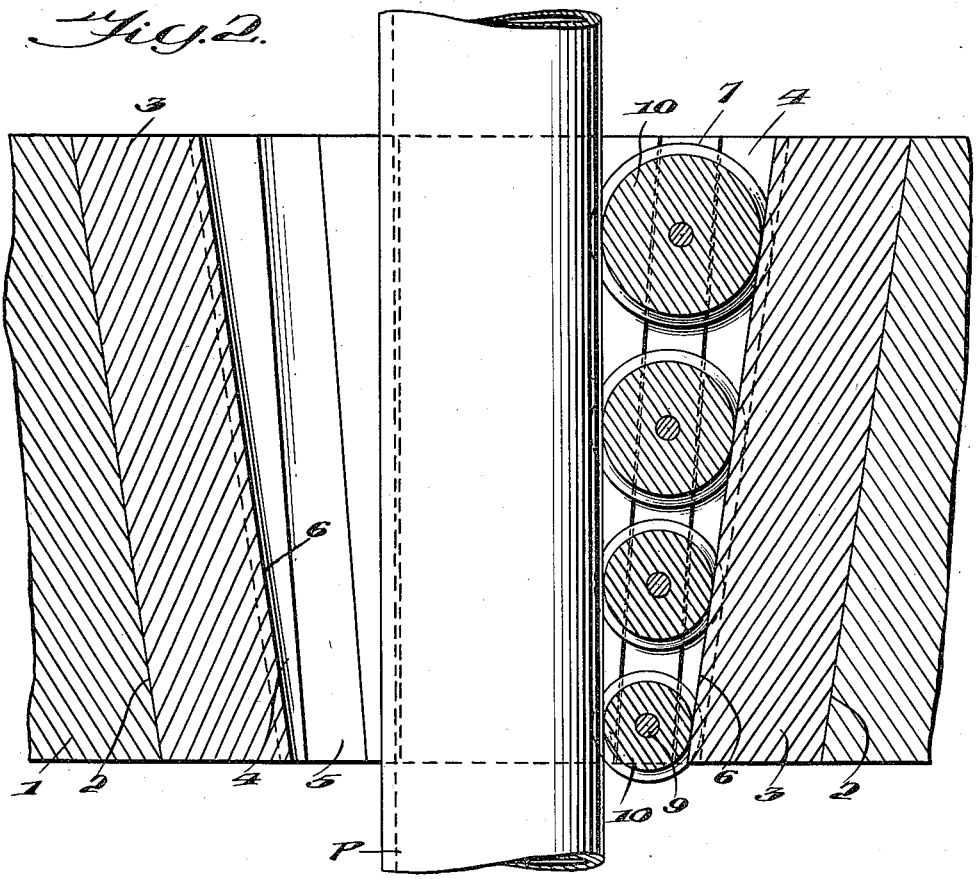
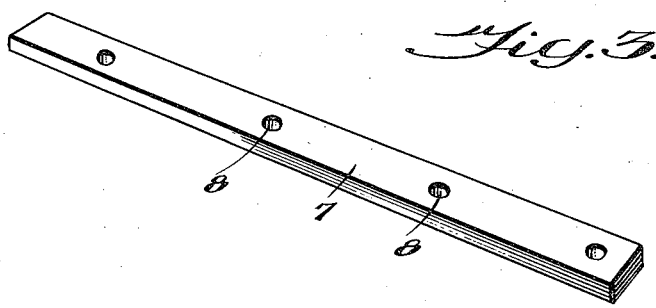
Inventor
George Miether
By J. Preston Swecker
his Attorney Patented May 12, 1942

2,283,082

UNITED STATES PATENT OFFICE 2,283,082

PIPE SLIP

George Miether, Odessa, Tex.

Application February 19, 1941, Serial No. 379,657

11 Claims. (Cl. 24—263)

This invention relates to an improvement in pipe slips of the type used in well drilling operations for the purpose of holding a drill pipe suspended in the well by a gripping action but which will release the pipe readily when it is moved upward or withdrawn.

The object of the invention is to simplify the construction of such pipe slips to reduce the cost thereof while yet providing an effective gripping action by means of rollers, which will not injure the pipe as does result from the use of slips having gripping teeth thereon to hold the pipe in place, of the character employing heretofore.

In carrying out this object, I employ a series of rollers mounted in carriers slidably mounted at opposite sides of each slip and so arranged as to provide a wedging action of the rollers against the sides of the drill pipe to grip the latter and hold it against downward movement or in its raised position, while permitting ready release of the pipe when it is drawn upward.

A preferred embodiment of the invention is illustrated in the accompanying drawings, in which:

Fig. 2 is a vertical sectional view therethrough, with one of the sets of rollers removed; and Fig. 3 is a detached perspective view of one of the roller carriers.

Figure 1:
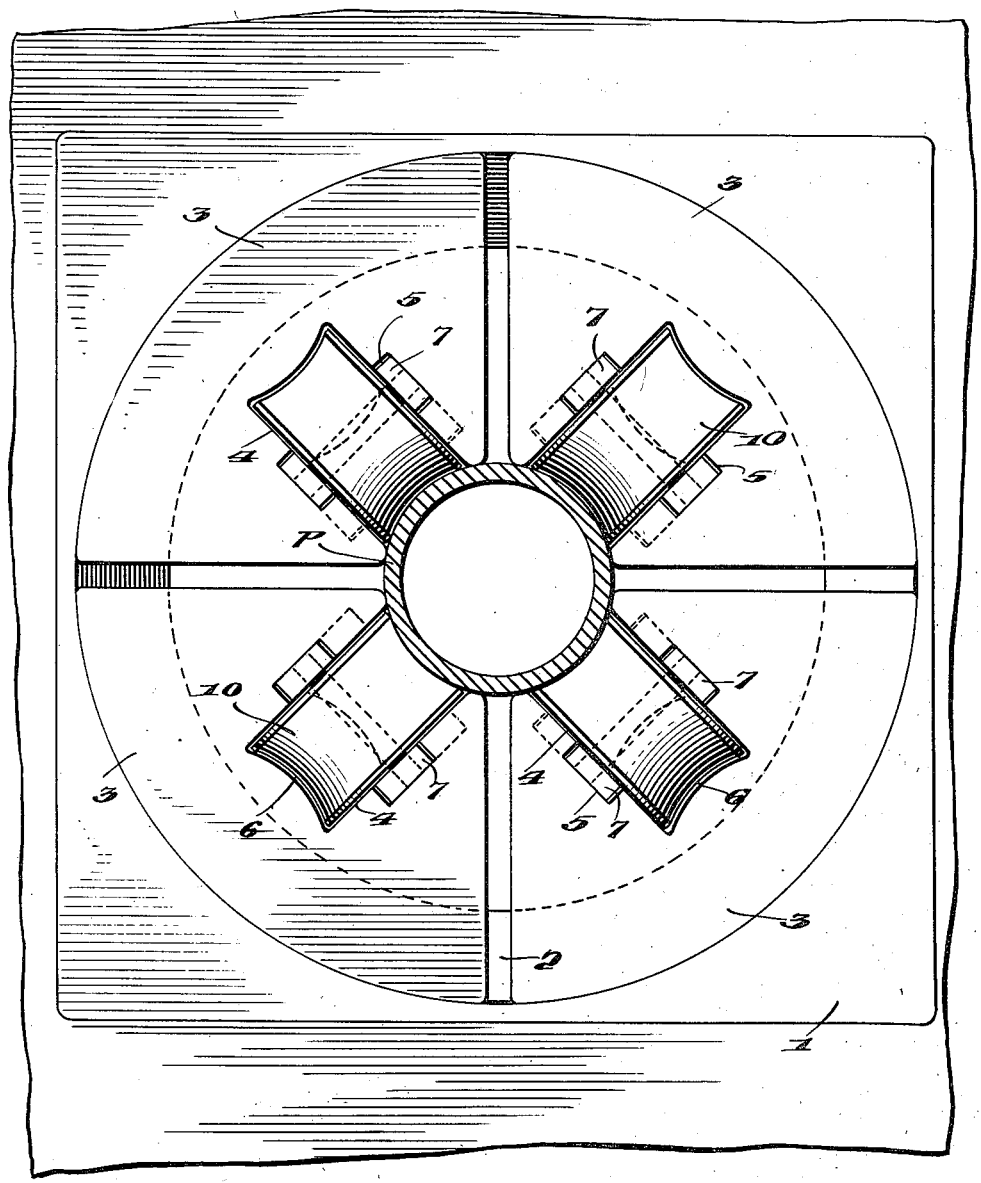
Fig. 1 is a top plan view of my improved pipe slips in place in a bowl of a rotary table.

My pipe slips are capable of use either in the opening of the usual rotary table, or in a special spider or bowl usually provided in the rotary table, although I have shown the slips as adapted for use in the rotary master bushing designated generally by the numeral 1 and which is normally seated in the central opening of the rotary table, through which the drill pipe P passes into the well. I prefer to use a plurality of segmental slips arranged about the drill pipe P for supporting the latter in the rotary table or the bushing or bowl thereof, being designed to be seated on the tapered inner surface 2 of said bushing.

Each slip comprises a body portion 3 of segmental shape, as shown in Fig. 1 with its outer wall tapered substantially in wedge shape to fit the taper of the seat 2 of the bowl or bushing, and has an inner channel 4 formed in the inner edge portion thereof, the sides of which channel are formed with grooves 5 therein. The back wall 6 of the channel 4 is formed of convex shape to bear against rollers as hereinafter described. The grooves 5 are arranged at an acute angle to the back wall 6 of each channel 4, which back wall forms an inner face inclined relative to the axis of the drill pipe.

Mounted in each of the grooves 5 at opposite sides of the channel 4, is a carrier 7 (Fig. 3) which is constructed of slightly smaller transverse width than the corresponding groove to fit loosely therein capable of sliding movement in the grooves for freedom of movement into wedging action between the back walls 6 and the drill pipe. The carriers 7 have openings 8 therein receiving and journaling pins 9, extending transversely between the carriers at opposite sides of the channel 4, and on which pins 9 are journaled rollers 10. The rollers 10 are constructed of concave shape at their peripheries adapted to substantially fit the periphery of the pipe P to be supported thereby. As shown in Fig. 2, the rollers 10 are graduated in size, decreasing in diameter from top to bottom of the slip, substantially to fill the space between the back wall 6 of the channel 4 and the periphery of the pipe P.

As shown in Fig. 2, a double wedging action is obtained within the slip by the difference in taper of the grooves 5 relative to the back wall 6 of the channel 4, whereby the rollers 10 slide downward in the channel 4 in a wedging action between the back wall 6 of the channel and the drill pipe, having the concave surface of the rollers riding on the convex surface of the wall 6, thus gripping the periphery of the pipe P, and holding it in its elevated position by the wedging action of the rollers, while leaving the drill pipe free for instant release upon further lifting or elevating movement thereof. During the downward sliding movement of the rollers 10 in the carriers 7, the latter move bodily laterally of the grooves 5 sufficient to accommodate the wedging action of the rollers 10 with substantially the size of drill pipe for which the slip is adapted. The body of the slip 3 is seated in the rotary table or tapered bowl thereof, and remains in its seated position, without moving in response to the lifting movements of the drill pipe, but the holding action is accomplished by the tightening up of the parts within the slip itself, due to the sliding wedging movements of the rollers mounted in the slip. This action effectively holds the drill pipe but without injury thereto as would result from the use of grooved or toothed grips or wedges of the character employed heretofore, but effectively holds the drill pipe and releases it for upward movement when desired.

When the rollers 10 slide down to the position shown in Fig. 2, where they engage the back wall 6 of the channel 4, the wedging action of the rollers between said back wall and the grooves 5 prevents further downward sliding movement of the rollers, which relation prevents the accidental slipping out of the rollers from the slip when the pipe is not in place in contact therewith.

I claim:

1. A pipe slip comprising a body adapted to be disposed beside a pipe and having an inclined inner face in position to be disposed toward the pipe at an angle to the axis thereof, a roller arranged in bearing relation to said inner face in position for pressure engagement with the pipe, and means mounting said roller in the body for bodily movement of said roller toward and from said inclined inner face and lengthwise relative thereto for wedging action between said face and the pipe.

2. A pipe slip comprising a body adapted to be disposed beside a pipe and having an inclined inner face in position to be disposed toward the pipe at an angle to the axis thereof, a roller arranged in bearing relation to said inner face in position for pressure engagement with the pipe, and means forming grooves at opposite sides of the body extending in a direction at an acute angle to the inner face of the body, said roller being mounted in the grooves for bodily movement relative thereto into wedging action between said body and the pipe.

3. A pipe slip comprising a body adapted to be disposed beside a pipe and having a channel in the inner portion thereof, said channel having inclined openings in opposite sides thereof, carriers slidably mounted respectively in said openings, and one or more rollers journaled in bridging relation between said carriers and carried thereby in position for wedging engagement with the pipe.

4. A pipe slip comprising a body adapted to be disposed beside a pipe and having a channel in the inner portion thereof, said channel having inclined grooves in opposite sides thereof, and having an inclined inner face arranged at an acute angle to the grooves, carriers slidably mounted in said grooves for longitudinal shifting movement relative thereto, and one or more rollers supported in bridging relation between the carriers in position for wedging engagement with the pipe.

5. A pipe slip comprising a body adapted to be disposed beside a pipe and having an inclined inner face in position to be disposed toward the pipe at an angle to the axis thereof, and a plurality of rollers arranged in wedging engagement with the inclined face of the body and disposed in position for pressure engagement with the pipe, said rollers having the side edges thereof opposite the body arranged substantially in a plane in position to be disposed parallel with the axis of the pipe.

6. A pipe slip comprising a body adapted to be disposed beside a pipe and having an inclined inner face in position to be disposed toward the pipe at an angle to the axis thereof, and a plurality of rollers arranged beside the inner face of the body and of gradually decreasing diameter from the top to the bottom thereof, in position for pressure engagement with the pipe, the inner edges of the rollers on the side thereof opposite from the inner face of the body being disposed substantially in an upright plane arranged in position to extend parallel with the axis of the pipe.

7. A pipe slip comprising a body adapted to be disposed beside a pipe and having a channel in the inner portion thereof, said channel having inclined grooves in opposite sides thereof, carriers slidably mounted in said grooves, pins extending between the carriers in bridging relation, a plurality of rollers mounted on the pins and journaled thereby in the carriers for bodily shifting movement relative to the body, said channel having an inclined inner face arranged at an acute angle to the grooves in position for limiting the downward sliding movement of the rollers, said rollers having gradually decreasing diameters from top to bottom of the body and arranged with the edges thereof opposite the inner face of the body in vertical alignment for joint engagement with the pipe.

8. A pipe holder comprising a plurality of pipe slips adapted to embrace a pipe and to support the same, each of said pipe slips having a body with a channel in the inner portion thereof, said channel having inclined grooves in opposite sides thereof and having an inclined inner face arranged at an acute angle to the grooves, carriers slidably mounted in said grooves for longitudinal movement relative thereto, a plurality of rollers journaled in the carriers in bridging relation therebetween, said rollers being of gradually decreasing diameter from top to bottom of the slip and having the inner edges thereof arranged in vertical alignment in position for joint wedging engagement with the pipe.

9. The combination with a pipe, of a supporting device therefor, comprising a plurality of pipe slips embracing the pipe, each of said slips having a body with a channel in the inner portion thereof toward the pipe, said channel having inclined grooves in opposite sides thereof and having an inclined inner face arranged at an acute angle to the angle of inclination of the grooves, carriers slidably mounted in said grooves for longitudinal shifting movement relative thereto, and a plurality of rollers journaled in the carriers in bridging relation therebetween, said rollers being mounted in wedging engagement with the pipe and between the same and the inclined inner face of the channel, said rollers having the inner edges thereof in vertical alignment.

10. A pipe slip comprising a body adapted to be disposed beside a pipe and having a channel in the inner portion thereof, said channel having inclined grooves in opposite sides thereof, carriers slidably mounted in said grooves, and one or more rollers journaled between said carriers and carried thereby in position for wedging engagement with the pipe, said carriers being loosely mounted in the grooves for freedom of movement into said wedging engagement.

11. A pipe slip comprising a body adapted to be disposed beside a pipe and having a channel in the inner portion thereof, said channel having inclined grooves in opposite sides thereof, and having an inclined inner face arranged at an acute angle to the grooves, carriers slidably mounted in said grooves for longitudinal shifting movement relative thereto, and one or more rollers supported in bridging relation between the carriers in position for wedging engagement with the pipe, said carriers being loosely mounted in the grooves for freedom of movement into said wedging engagement.

GEORGE MIETHER.